US009179071B2

(12) United States Patent
Kuo et al.

(10) Patent No.: US 9,179,071 B2
(45) Date of Patent: Nov. 3, 2015

(54) ELECTRONIC DEVICE AND IMAGE SELECTION METHOD THEREOF

(71) Applicant: HTC Corporation, Taoyuan Taoyuan County (TW)

(72) Inventors: Tzu-Hao Kuo, Taoyuan (TW); Chun-Hsiang Huang, Taoyuan (TW); Liang-Kang Huang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 14/165,832

(22) Filed: Jan. 28, 2014

(65) Prior Publication Data

US 2014/0218555 A1   Aug. 7, 2014

Related U.S. Application Data

(60) Provisional application No. 61/759,448, filed on Feb. 1, 2013, provisional application No. 61/759,444, filed on Feb. 1, 2013, provisional application No. 61/759,440, filed on Feb. 1, 2013.

(51) Int. Cl.
*H04N 5/225* (2006.01)
*H04N 5/232* (2006.01)
*G11B 27/034* (2006.01)
*G11B 27/34* (2006.01)
*G06T 11/60* (2006.01)
*G06T 3/40* (2006.01)

(52) U.S. Cl.
CPC .......... *H04N 5/23293* (2013.01); *G06T 3/4038* (2013.01); *G06T 11/60* (2013.01); *G11B 27/034* (2013.01); *G11B 27/34* (2013.01); *H04N 5/23216* (2013.01); *H04N 5/23229* (2013.01)

(58) Field of Classification Search
CPC .......... H04N 5/23293; H04N 5/23216; H04N 5/23229; G06T 3/4038; G06T 11/60; G11B 27/34; G11B 27/034
USPC ............................................ 348/220.1, 222.1
See application file for complete search history.

(56) References Cited

U.S. PATENT DOCUMENTS

2012/0275655 A1 * 11/2012 Uchida et al. ................. 382/107
2013/0016877 A1 *  1/2013 Feris et al. .................... 382/103

* cited by examiner

*Primary Examiner* — Yogesh Aggarwal
(74) *Attorney, Agent, or Firm* — McClure, Qualey & Rodack, LLP

(57) ABSTRACT

An electronic device and an image selection method thereof are provided. The electronic device is configured to obtain a series of images; determine camera states corresponding to the series of images; select first images from the series of images according to the camera states; determine object states corresponding to the first images; divide the first images into a number of groups according to the object states; and select a candidate image from each of the number of groups. The image selection method is applied to the electronic device to implement the aforesaid operations.

19 Claims, 8 Drawing Sheets

ELECTRONIC DEVICE AND IMAGE SELECTION METHOD THEREOF

This application claims the benefit of U.S. Provisional Application Nos. 61/759,448, 61/759,444 and 61/759,440 filed on Feb. 1, 2013, which are hereby incorporated by reference in their entireties.

CROSS-REFERENCES TO RELATED APPLICATIONS

Not applicable.

BACKGROUND OF THE INVENTION

1. Field of the Invention

The present invention relates to an electronic device and an image processing method thereof. In particular, the present invention relates to an electronic device and an image selection method thereof.

2. Descriptions of the Related Art

Electronic devices, such as computers, mobile phones, and digital camera, have improved with better functionality and performances on image processes thereof so that they are capable of capturing multiple images in a relatively short time. Users may use the burst-shooting mode to capture a plurality of images either automatically or manually. Once a series of images is obtained (normally captured with the same scene and objects), the series of images can be further processed to generate at least one composed image with particular effects or compositions. However, not every image in the series is good enough to use in an image composition or with a special effect. Some of the images might be blurred, out of focus, too similar to other images, or off-centered. As a result, the series of images should be processed and selected to identify usable images among the series of images which meets the needs of later image compositions or effects.

For example, a series of images may be captured while a person walks through the streets. Some of the images might be out of focus due to the movements of the person or surrounding objects, like cars. Some of the images might be obscured by other passing objects. In this situation, it would be helpful for the user to filter out unusable images (e.g., images with bad image quality or images without the desired objects) and select several usable images for the desired effect or composition. For example, the desired composition is to depict the path of the person.

In view of this, it is important to identify usable images among a series of images for meeting the needs of particular image compositions or effects.

SUMMARY OF THE INVENTION

An objective of the present invention is to identify usable images among a series of images for meeting the needs of particular image compositions or effects.

To this end, the present invention provides an electronic device. The electronic device comprises an image source unit and an image processing unit which is coupled to the image source unit. The image source unit is configured to obtain a series of images. The image processing unit is configured to determine camera states corresponding to the series of images; select first images from the series of images according to the camera states; determine object states corresponding to the first images; divide the first images into a number of groups according to the object states; and select a candidate image from each of the number of groups.

To this end, the present invention further provides an image selection method for use in an electronic device. The electronic device comprises an image source unit and an image processing unit which is coupled to the image source unit. The image selection method comprises the following steps:

(a) obtaining a series of images by the image source unit;

(b) determining camera states corresponding to the series of images by the image processing unit;

(c) selecting first images from the series of images according to the camera states by the image processing unit;

(d) determining object states corresponding to the first images by the image processing unit;

(e) dividing the first images into a number of groups according to the object states by the image processing unit; and (f) selecting a candidate image from each of the number of groups by the image processing unit.

To this end, the present invention further provides an image selection method for use in an electronic device. The image selection method comprises the following steps:

(a) obtaining a series of images;

(b) determining motion vectors corresponding to each of the series of image with respect to a neighboring image;

(c) determining camera states corresponding to the series of images according to the motion vectors;

(d) determining pixel variance of a first portion of the series of images in a first camera state;

(e) dividing the first portion of the series of images into a plurality of groups according to the pixel variance; and (f) selecting a candidate image from each of the plurality of groups.

Specifically, to provide a better result of the object in motion, the present invention may first analyze a series of images to obtain the camera states of the series of images and classify the series of images into two groups: a camera-motion state and a camera-still state. The camera states may be determined by performing feature matching analysis to obtain variances of background objects among the series of images. The images classified in the camera-motion state may comprise somewhat different scenes since the camera is in the motion state (moving); as a result, it would be more difficult to compose an image of objects at different positions within the same scene. These images would be filtered out from the series of images and would not be processed any further. The remaining images that are classified in the camera-still state comprise the same scene and one or more common objects appearing at different positions of the scene. That is the remaining images can be used for later image compositions and/or other image operations designated by users. In addition, the remaining images are further analyzed to select a sequence of consecutive images in time order. The sequence of consecutive images should comprise at least a predetermined number of images. That is to say, the electronic device should have captured at least the predetermined number of images without moving the position of the electronic device for a period of time. If the original series of images does not comprise enough consecutive images, the process can be terminated.

If such sequence of consecutive images is found, the consecutive images are then analyzed to determine the similarity between consecutive images and divided into a predetermined number of groups. The second processing is aimed to determine the variance of foreground objects in the consecutive images and can be implemented by feature extraction and clustering technique. In other words, the second processing is aimed to determine object states corresponding to the consecutive images. Image clustering can be achieved by comparing differences of each image to other images to obtain corresponding features of the image, and dividing the consecutive images into the predetermined number of groups according to the feature. Lastly, a selection is made to choose candidate images from the groups respectively. These candidate images can be used to perform image compositions and/or other image operation designated by users. Consequently, the present invention can be implemented to effectively identify usable images among a series of images for meeting the needs of particular image compositions or effects.

The detailed technology and preferred embodiments implemented for the present invention are described in the following paragraphs accompanying the appended drawings for persons skilled in the art to well appreciate the features of the claimed invention.

DETAILED DESCRIPTION OF THE INVENTION

The present invention may be explained with reference to the following embodiments. However, these embodiments are not intended to limit the present invention to any specific environments, applications or implementations described in these embodiments. Therefore, the description of these embodiments is only for the purpose of illustration rather than limitation. In the following embodiments and the attached drawings, elements not directly related to the present invention are omitted from depiction. In addition, the dimensional relationships among individual elements in the attached drawings are illustrated only for ease of understanding, but not to limit the actual scale.

Figure 1:
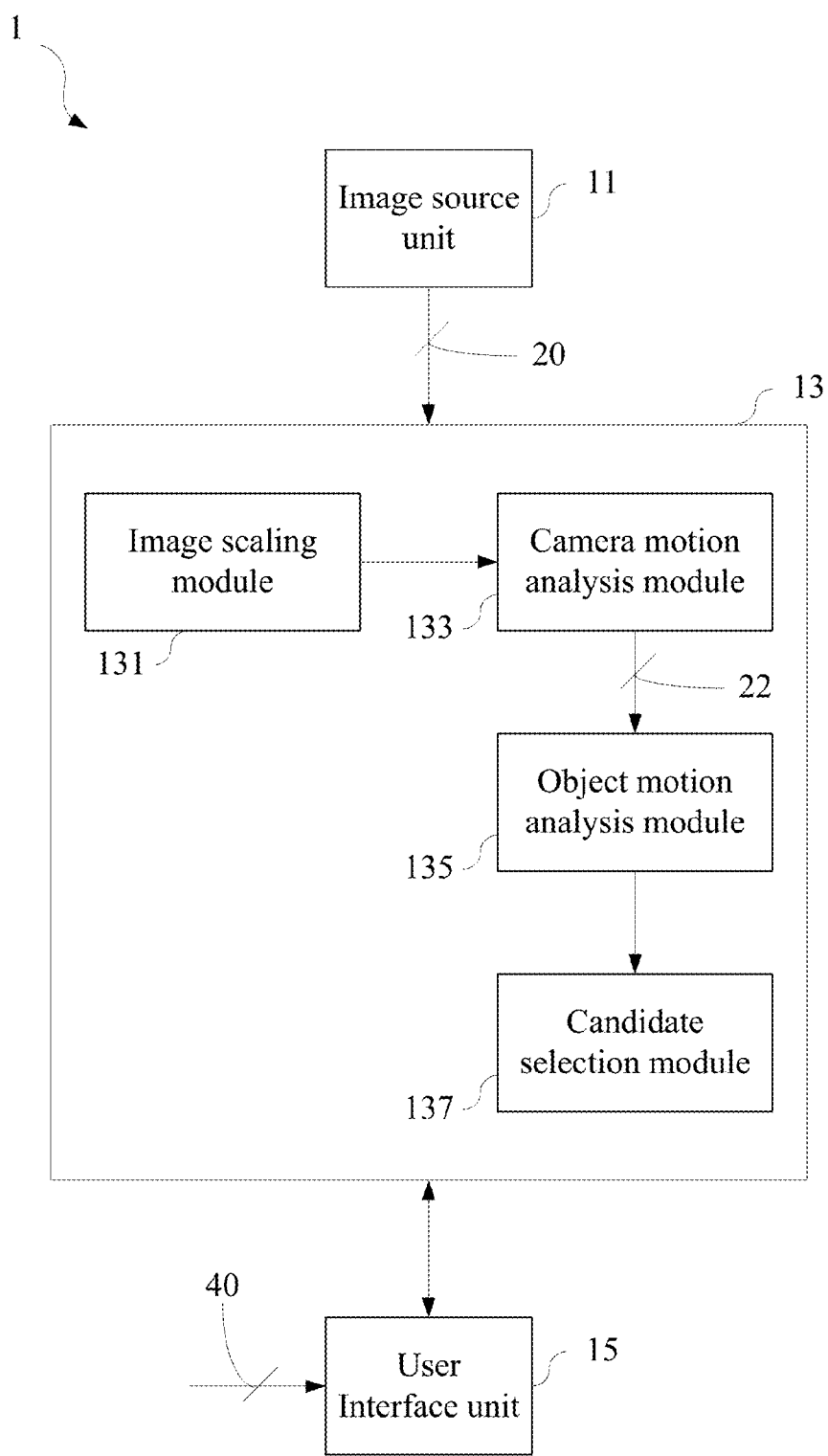
FIG. 1 is a schematic view of an electronic device according to a first embodiment of the present invention.

A first embodiment of the present invention is an electronic device. A schematic view of the electronic device is shown in FIG. 1. As shown in FIG. 1, the electronic device 1 may comprise at least one image source unit 11 and an image processing unit 13 which receives inputs from the image source unit 11. The image processing unit 13 is coupled to the image source unit 11. The electronic device 1 may optionally comprise a user interface unit 15 which is coupled to the image processing unit 13. The electronic device 1 may be a device such as a digital camera, a smart phone, a tablet, a PDA, a game console, a laptop/desktop computer, or a television. The image source unit 11 is configured to provide a series of images 20, which may be captured in auto burst, multiple single shots and/or other image capture mechanisms. The image source unit 11 may be an image capture device (such as a camera sensor/lens module), an internal/external memory, or a wireless storage device connected via a wireless protocol.

The image processing unit 13 is configured to determine camera states corresponding to the series of images 20, select first images 22 from the series of images according to the camera states, determine object states corresponding to the first images 22, divide the first images 22 into a number of groups according to the object states, and select a candidate image from each of the number of groups.

If the electronic device 1 comprises the user interface unit 15, the user interface unit 15 is configured to display the series of images 20 and receive user inputs 40 corresponding to an operation on at least a portion of the series of images 20. The user interface unit 15 can be a touch screen, a display unit together with an I/O control device (such as a mouse, a keyboard and/or a track pad, etc.), and/or a suitable I/O control device. The user is capable to launch an image application (not shown) to perform the aforesaid operations of the image processing unit 13. In other words, the image processing unit 13 may be configured to execute the image application and process the aforesaid operations according to the user inputs 40 from the user interface unit 15.

As an example of this embodiment, the image processing unit 13, among others, may further comprise an image scaling module 131, a camera motion analysis module 133, an object motion analysis module 135 and a candidate selection module 137. In another example of this embodiment, the image processing unit 13 may also be a single processor that executes corresponding operations of the individual modules described above.

The image scaling module 131 is an optional module for the image processing unit 13. The image scaling module 131 is configured to scale down the series of images 20 in lower resolution before determining the camera states. Specifically, the image scaling module 131 is configured to scale the series of images 20 received from the image source unit 11, which may be from a higher to a lower resolution. The purpose of scaling down the resolution of the series of images 20 is to reduce the computation load of the image processing unit 13 and thus, provide better performance.

The camera motion analysis module 133 is configured to determine motion vectors corresponding to each of the series of images 20 with respect to the neighboring image, determine the camera states corresponding to the series of images 20 according to the motion vectors, and select the first images 22 from the series of images 20 according to the camera states. Specifically, the camera motion analysis module 133 may be configured to derive the motion state of the electronic device 1 while capturing the series of images 20 to determine the camera states corresponding to the series of images 20 and extract a sequence of consecutive images 22 (i.e., the first images 22) in the camera-still state.

The camera motion analysis module 133 may process the series of images 20 in a lower resolution to speed up processing if the series of images 20 has been processed by the image scaling module 131. The motion state of the electronic device 1 may be derived by extracting features from each of the series of images 20 (generally corresponds to background objects), and calculating motion vectors corresponding to feature differences between two consecutive frames of the series of images 20.

Figure 2:
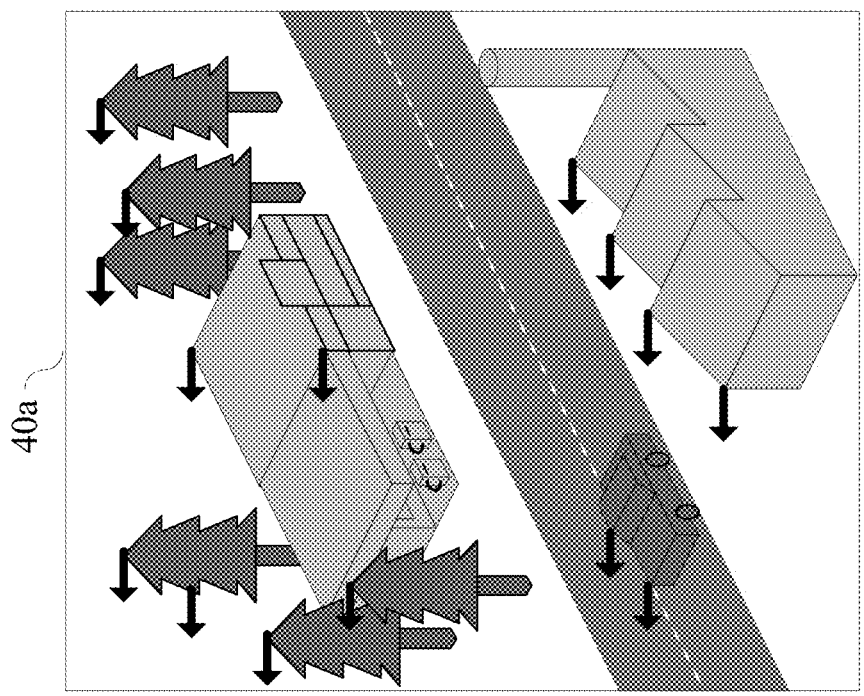
FIG. 2 illustrates an example of feature extraction and motion vector formation according to the first embodiment of the present invention.
Figure 2:
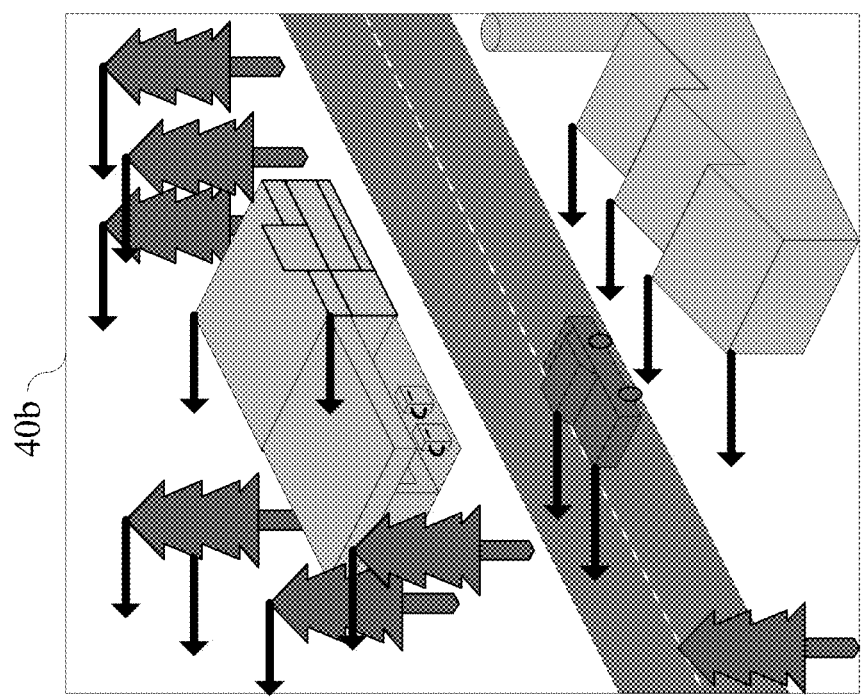

FIG. 2 illustrates an example of feature extraction and motion vector formation. As can be observed, several feature points are identified in two consecutive frames (i.e. the first frame 40a and the second frame 40b). Differences between two corresponding feature points are indicated by the arrows. The arrows may represent motion vectors between two consecutive images.

The motion state of the electronic device 1 may be determined by the popularity of the motion vectors. As described above, the motion state of the electronic device 1 can be derived from the motion of background objects (such as the trees and buildings indicated in FIG. 2). Therefore, the motion vectors of an image are further filtered to eliminate feature points corresponding to foreground objects (such as the car indicated in FIG. 2), which should have relatively higher differences.

The camera motion analysis module 133 may divide the motion vectors into two groups, one with higher popularity corresponding to background and the other with lower popularity corresponding to foreground. This is because the feature points that are identified should be more likely to lie in the background rather than the foreground. As a result, the motion vectors with lower popularity may indicate that the feature points belong to the foreground. The motion vectors corresponding to background feature points are further processed to derive the motion state of the electronic device 1.

Figure 3:
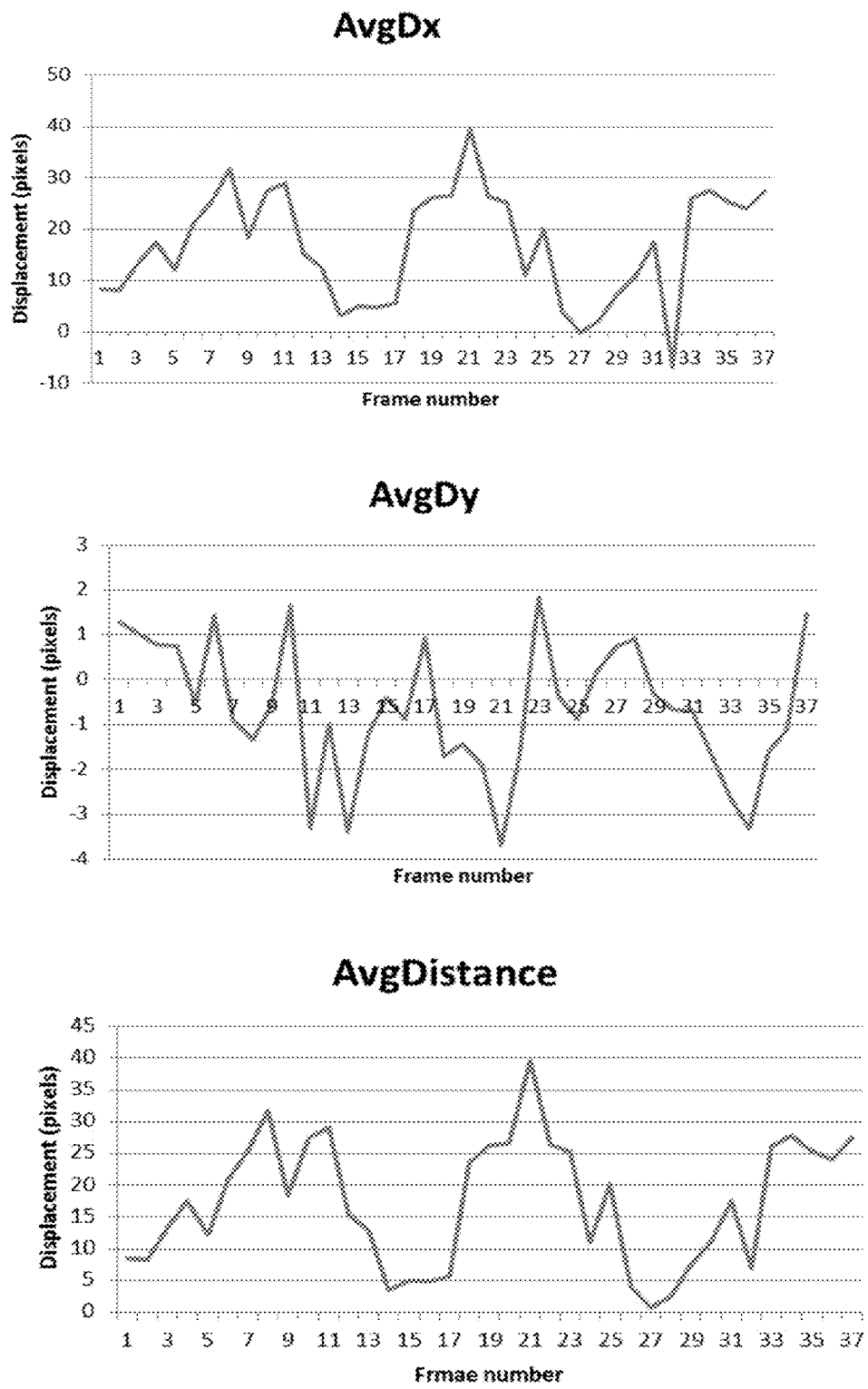
FIG. 3 illustrates an example of derivation of a motion state of the electronic device according to the first embodiment of the present invention.

FIG. 3 illustrates an example of derivation of a motion state of the electronic device 1. The motion state of the electronic device 1 in this example is derived by averaging the motion vectors of each image in three different dimensions, i.e., an x-dimension, a y-dimension and a Euclidian distance (xy-dimension). That is to say, the average motion vectors corresponding to the series of images 20 form the diagram as shown in FIG. 3.

Figure 4:
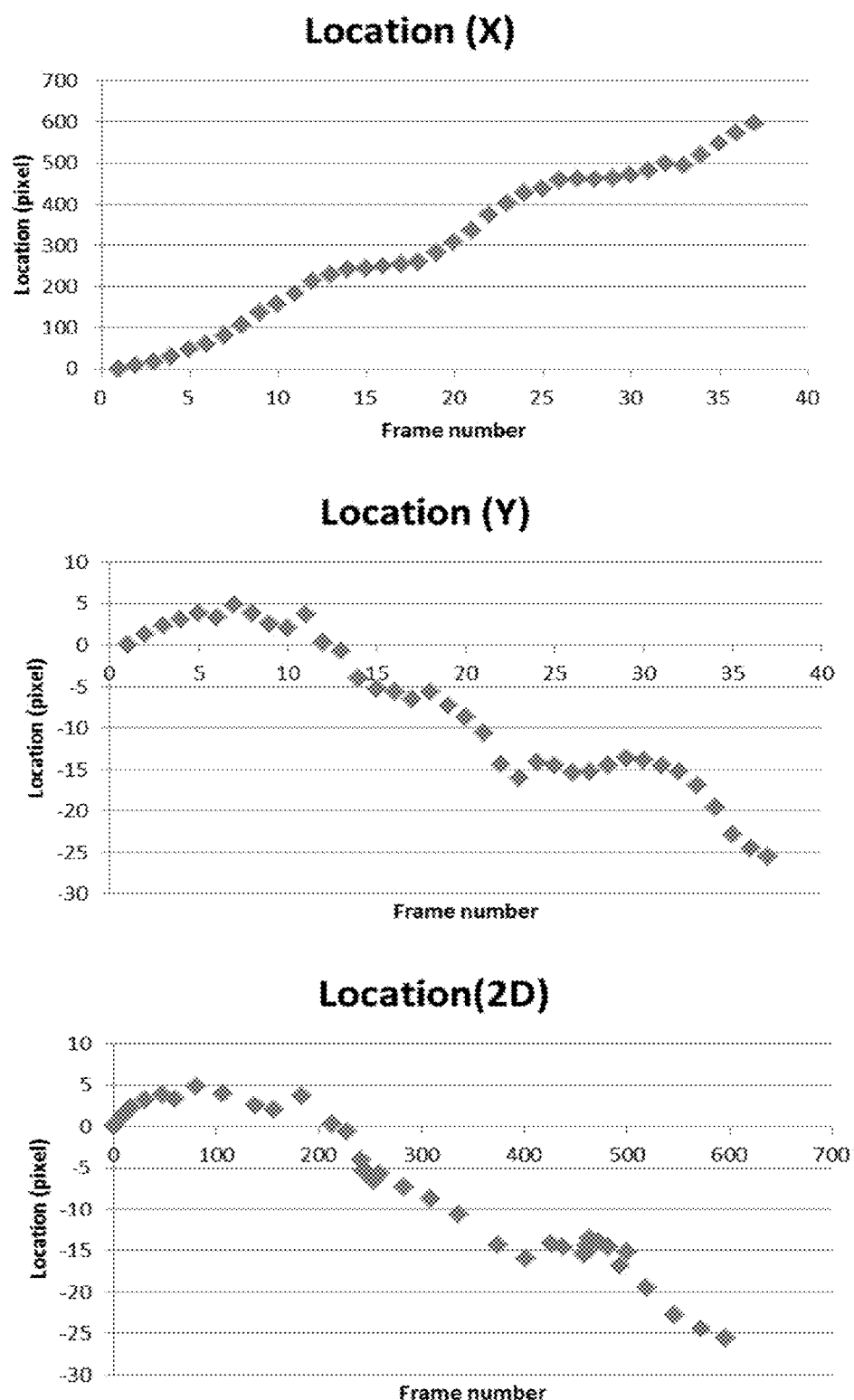
FIG. 4 illustrates an example of respective camera locations corresponding to images in x-dimension, y-dimension and xy-dimension measured in pixel unit according to the first embodiment of the present invention.
Figure 5:
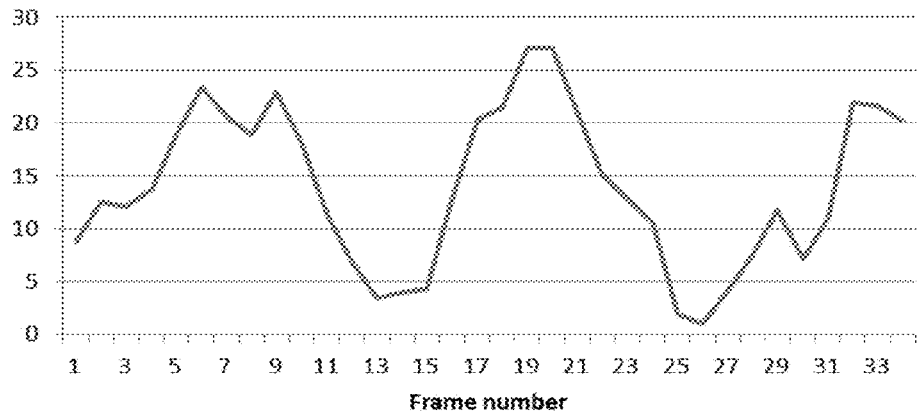
FIG. 5 illustrates an example of location derivation of the electronic device according to the first embodiment of the present invention.
Figure 5:
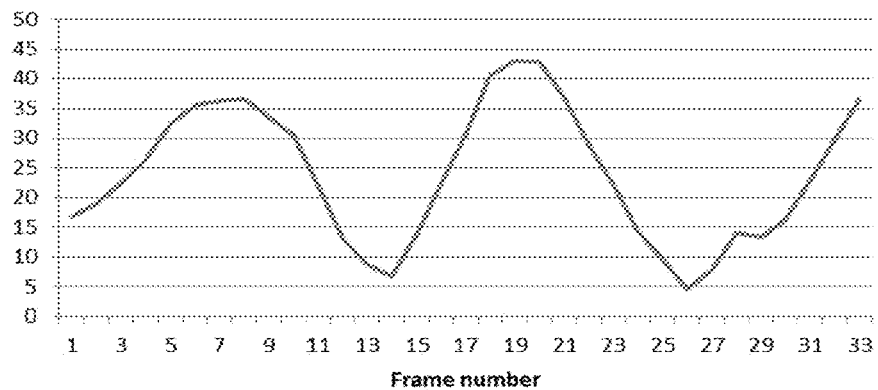
Figure 5:
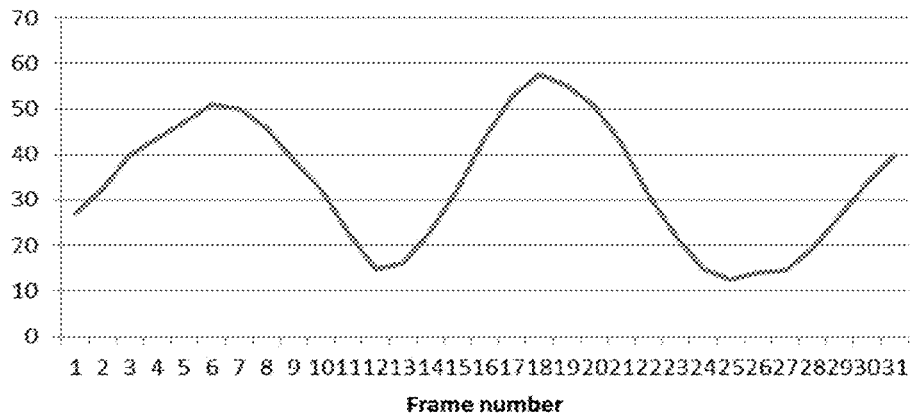

The average motion vectors can be used to roughly restore the respective camera location corresponding to the images in the x-dimension, y-dimension and xy-dimension (i.e., a 2D dimension) measured in pixel units as shown in FIG. 4. The respective location information can be used to derive the location deviation of the electronic device 1 as shown in FIG. 5. High location deviation represents large camera motion, while low location deviation represents slight camera motion. Consequently, the electronic device 1 can be in the camera-motion state or camera-still state when capturing respective images 20.

As described above, the camera motion analysis module 133 will extract a sequence of consecutive images (i.e. the first images 22) in the camera-still state from the series of images 20. To achieve such purpose, a threshold and/or a window can be set to find the sequence of consecutive images 22. The number of consecutive images 22 may be predetermined or be set by the user. The window can be set to local minimums of the location deviation and extend to the predetermined number of the consecutive images 22. In another example of this embodiment, the window may comprise many images with a difference of a local minimum deviation lower than the predetermined threshold. If the difference between the maximum and minimum deviation values is below the threshold, the sequence of consecutive images 22 are determined to be in the camera-still state and can be later used for image composition or other effects.

In another example of this embodiment, the window can be set to include all images with deviation difference lower than or equal to the threshold. The number of images within the window is counted and compared with the predetermined number. If the number is larger than the predetermined number, the sequence of images is determined as in the camera-still state. If not, the sequence of images is determined to be in camera-motion state. In another example of this embodiment, if two or more sequences are determined to be in the camera-still state, a sequence with the lowest deviation difference is selected for output. In another example of this embodiment, the sequence with the largest number of images is selected for output.

To summarize the above, the camera motion analysis module 133 extracts feature points corresponding to each of the series of images 20, calculates motion vectors according to the feature points, determines the background objects corresponding to each of the series of images 20 according to the popularity of the motion vectors to reserve feature points with high population which reflect background objects (by eliminating foreground objects with less population), calculates the average motion vectors of the background objects corresponding to each of the series of images 20, derives the location deviations corresponding to the series of images 20 according to the average motion vectors, determines the camera states corresponding to the series of images 20 according to the location deviations to determine a sequence of consecutive images 22 in the camera-still state.

Once the sequence of consecutive images 22 in the camera-still state is determined, the object motion analysis module 135 is configured to determine the pixel variance of the sequence of consecutive images 22. If only the first portion in each of the sequence of consecutive images 22 is considered, the object motion analysis module 135 may also be configured to determine the pixel variance of the first portions of the sequence of consecutive images 22. The pixel variance may be calculated by the sum of square differences (SSD), the sum of absolute differences (SAD), or the mean square differences (MSD), etc. With the image scaling module 131, the object motion analysis module 135 may perform the processing on the scaled images in lower resolution to improve performance.

Figure 6:
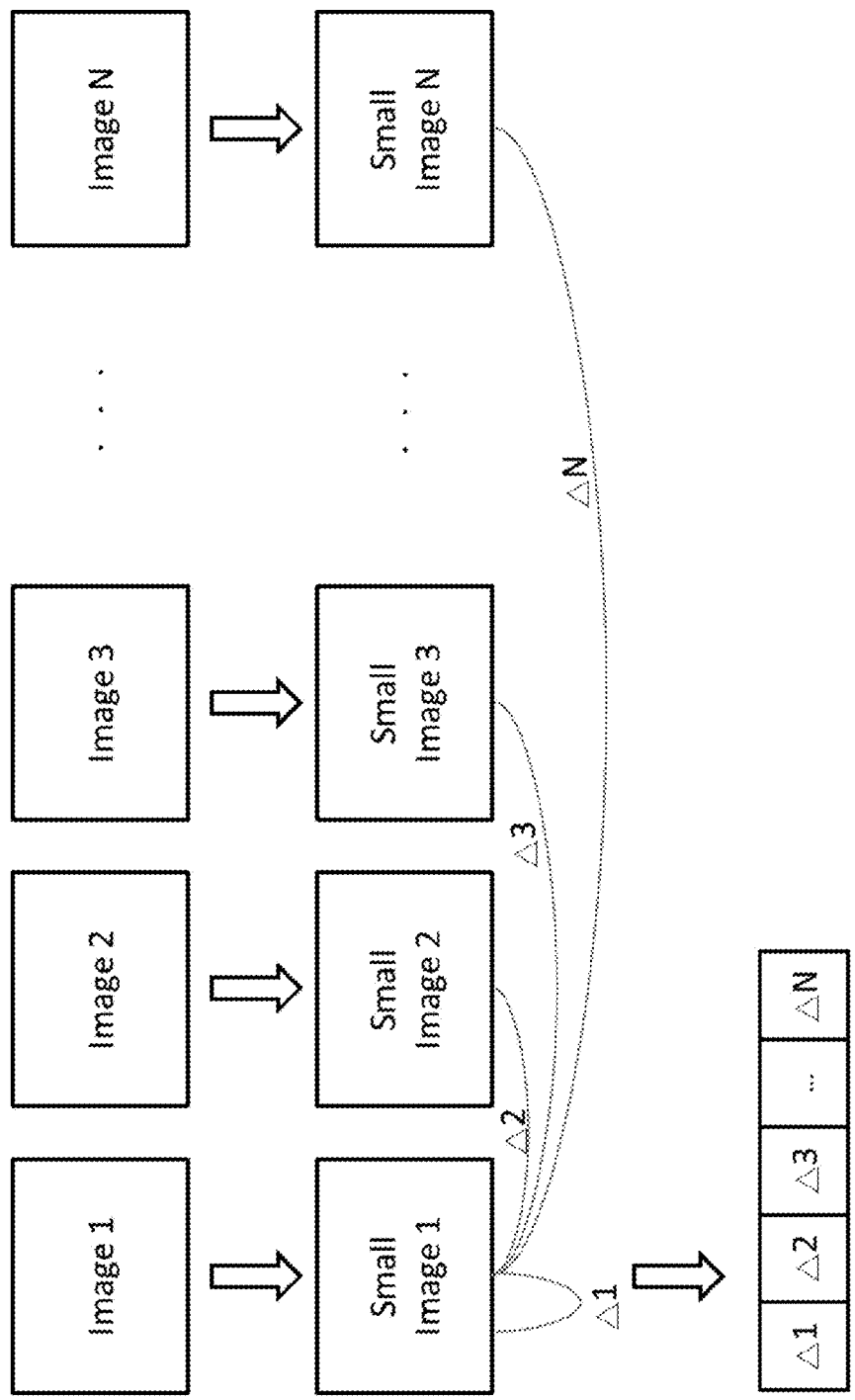
FIG. 6 illustrates an example of feature vector extraction according to the first embodiment of the present invention.

FIG. 6 illustrates an example of feature vector extraction. For instance, assume that the sequence comprises N consecutive images 22 and each of the consecutive images 22 is further divided into M blocks, in which M is predetermined or has a fixed number of pixels. The average pixel value of each block is calculated. The image 22 can be expressed by the average pixel values of the M blocks. The average pixel value may be average color value, or average brightness value, etc. A feature vector corresponding to each of the consecutive images 22 can be calculated by differences of the average pixel value (i.e., the pixel variance) of corresponding blocks to other images 22. For each of the consecutive images 22, the feature vector can be an array of M×N in size, or be simplified to a vector of N values in which each vector value is the average difference of the M blocks.

As shown in FIG. 6, the consecutive images 22 (i.e. Images 1 to N of higher resolution) are respectively transformed into Small Images 1 to N of lower resolution. The feature vector of each of the Small Images is calculated. Alternatively, the feature vector of the consecutive images 22 may be calculated without the resolution transforming. The calculated feature vectors can be used to divide the consecutive images 22 into predetermined number of groups by a clustering technique known in the art. The purpose of extracting feature vectors by dividing images 22 into blocks is that the electronic device 1 may experience slight movements or vibrations due to unsteady hands or the like, but is still regarded as in the camera-still state comparatively. To reduce the influence of such slight movement, the feature vectors are calculated by average values of the blocks so that the slight variance caused by unsteady hand movements can be compensated or reduced.

The object motion analysis module 135 is further configured to determine the object states according to the pixel variance and divide the sequence of consecutive images 22 into a certain number of groups according to the object states. Next, a candidate image is selected from each of the groups. The dividing processes can be implemented by clustering algorithms, such as K-means clustering known in the art. The images 22 are divided according to the similarity of foreground object motion. The smaller the pixel variance between two consecutive images, the less movement there is in the present object. As a result, images of the same group may have foreground objects appearing at similar or identical locations. The foreground objects appear at different locations among the different groups. In another embodiment of the invention, to achieve better performance, the camera states may be analyzed in lower resolution and the image clustering may be performed in full resolution.

The candidate image may be selected by predetermined criteria, such as the image with pixel values closest to the median/average value of the group, the image with largest distance to neighboring groups, etc. The number of groups can be predetermined, designated by user, or dynamically determined. The number of groups may be determined according to different image compositions and or other image operation designated by users.

For instance, if an image composition is to show a plurality of the same objects with different motions/locations within the same scene, the consecutive images 22 may be divided into at least two groups upon determining the object states into the object motion state. A candidate image is selected from each of the at least two groups. Next, the same objects with different motions/locations can be optionally extracted from the candidate images to perform the desired image composition.

If an image operation is used to select an image where the best look of a still object is shown from the consecutive images 22 which all comprise the still object, the consecutive images 22 may be divided into at least one group upon determining the object states into the object still state. A candidate image is selected from the at least one group to perform the desired image operation.

A second embodiment of the present invention is an image selection method for use in an electronic device. The image selection method described in this embodiment may be applied to the electronic device 1 described in the first embodiment. Therefore, the electronic device described in this embodiment may be considered as the electronic device 1 described in the first embodiment. It may comprise at least one image source unit and an image processing unit which is coupled to the image source unit for receiving input images.

Figure 7:
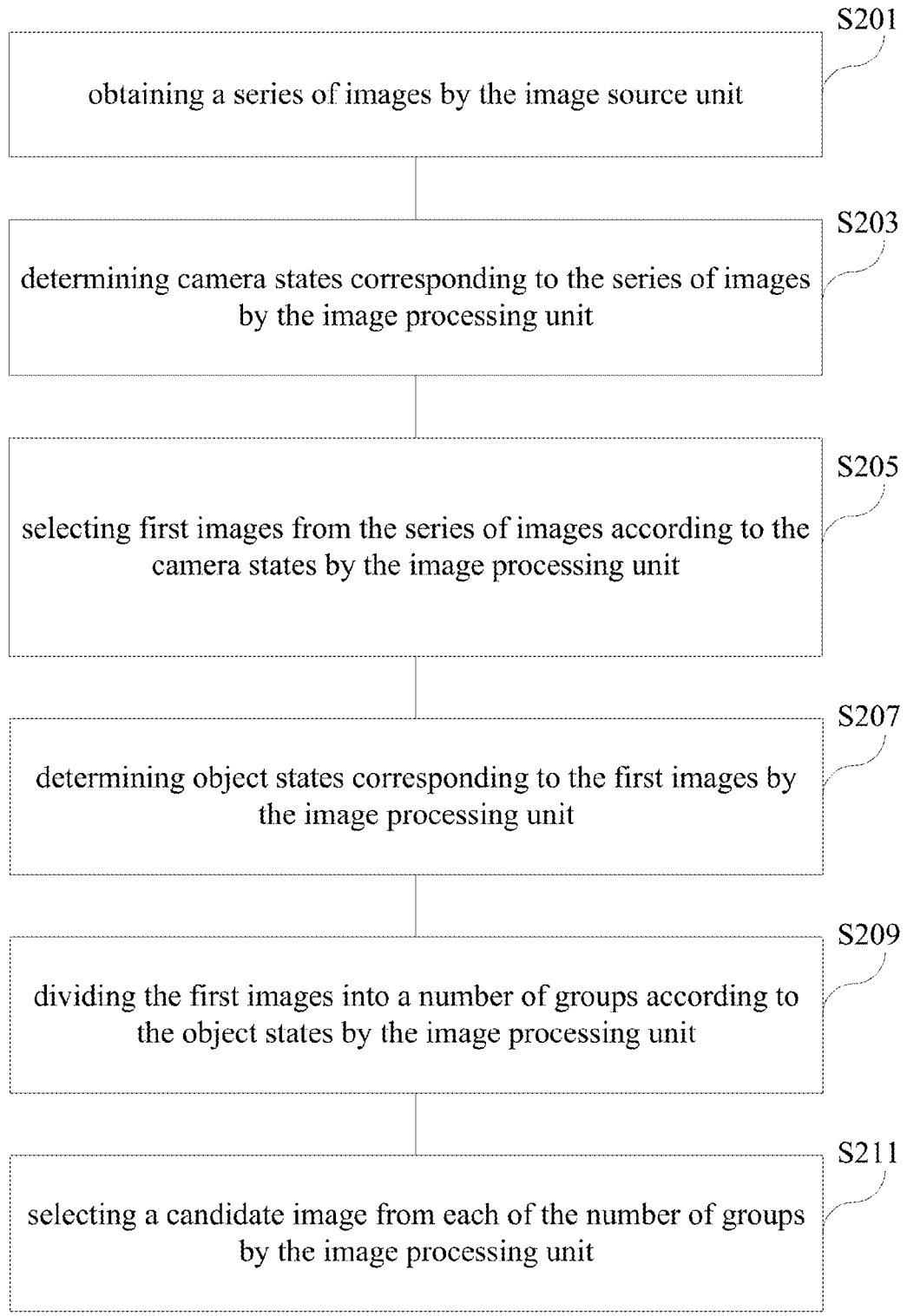
FIG. 7 is a flowchart of an image selection method for use in an electronic device according to a second embodiment of the present invention.

A flowchart of the image selection method for use in the electronic device is shown in FIG. 7. As shown in FIG. 7, the image selection method comprises steps S201, S203, S205, S207, S209, and S211. The sequence of the image selection method is changeable without departing from the spirits of the present invention. In detail, step S201 is executed to obtain a series of images by the image source unit; step S203 is executed to determine camera states corresponding to the series of images by the image processing unit; step S205 is executed to select first images from the series of images according to the camera states by the image processing unit; step S207 is executed to determine object states corresponding to the first images by the image processing unit; step S209 is executed to divide the first images into a number of groups according to the object states by the image processing unit; and step S211 is executed to select a candidate image from each of the number of groups by the image processing unit.

In one example of this embodiment, upon the object states are determined into an object-motion state, the first images are divided into at least two groups and a candidate image is selected from each of the at least two groups. In one example of this embodiment, upon the object states are determined into an object-still state, the first images are divided into at least one group and the candidate image is selected from the at least one group.

In one example of this embodiment, step S203 may further comprise the following steps: determining motion vectors corresponding to each of the series of images with respect to a neighboring image by the image processing unit; and determining the camera states corresponding to the series of images by the image processing unit according to the motion vectors. In another example, the step of determining motion vectors may further comprise the following steps: extracting feature points corresponding to each of the series of images by the image processing unit; and determining the motion vectors according to the feature points by the image processing unit. In addition, determining the camera states may further comprise the following steps: determining background objects corresponding to each of the series of images according to popularity of the motion vectors by the image processing unit; calculating average motion vectors of the background objects corresponding to each of the series of images by the image processing unit; deriving location deviations corresponding to the series of images according to the average motion vectors by the image processing unit; and determining the camera states corresponding to the series of images by the image processing unit according to the location deviations.

In one example of this embodiment, step S207 may further comprise the following steps: determining pixel variance of a first portion of the first images by the image processing unit; and determining the object states according to the pixel variance by the image processing unit.

In one example of this embodiment, the image selection method may further comprise the following step: scaling down the series of images in resolution by the image processing unit before determining the camera states.

In one example of this embodiment, the electronic device may further comprise a user interface unit which is coupled to the image processing unit. In addition, the image selection method further comprises the following step: displaying the series of images and receiving user inputs corresponding to an operation on at least a portion of the series of images by the user interface unit.

In addition to the aforesaid steps, the image selection method of this embodiment may further comprise other steps corresponding to all the operations of the electronic device 1 set forth in the first embodiment and accomplishes all the corresponding functions. Since the steps which are not described in this embodiment can be readily appreciated by persons skilled in the art based on the explanations of the first embodiment, they will not be further described herein.

Figure 8:
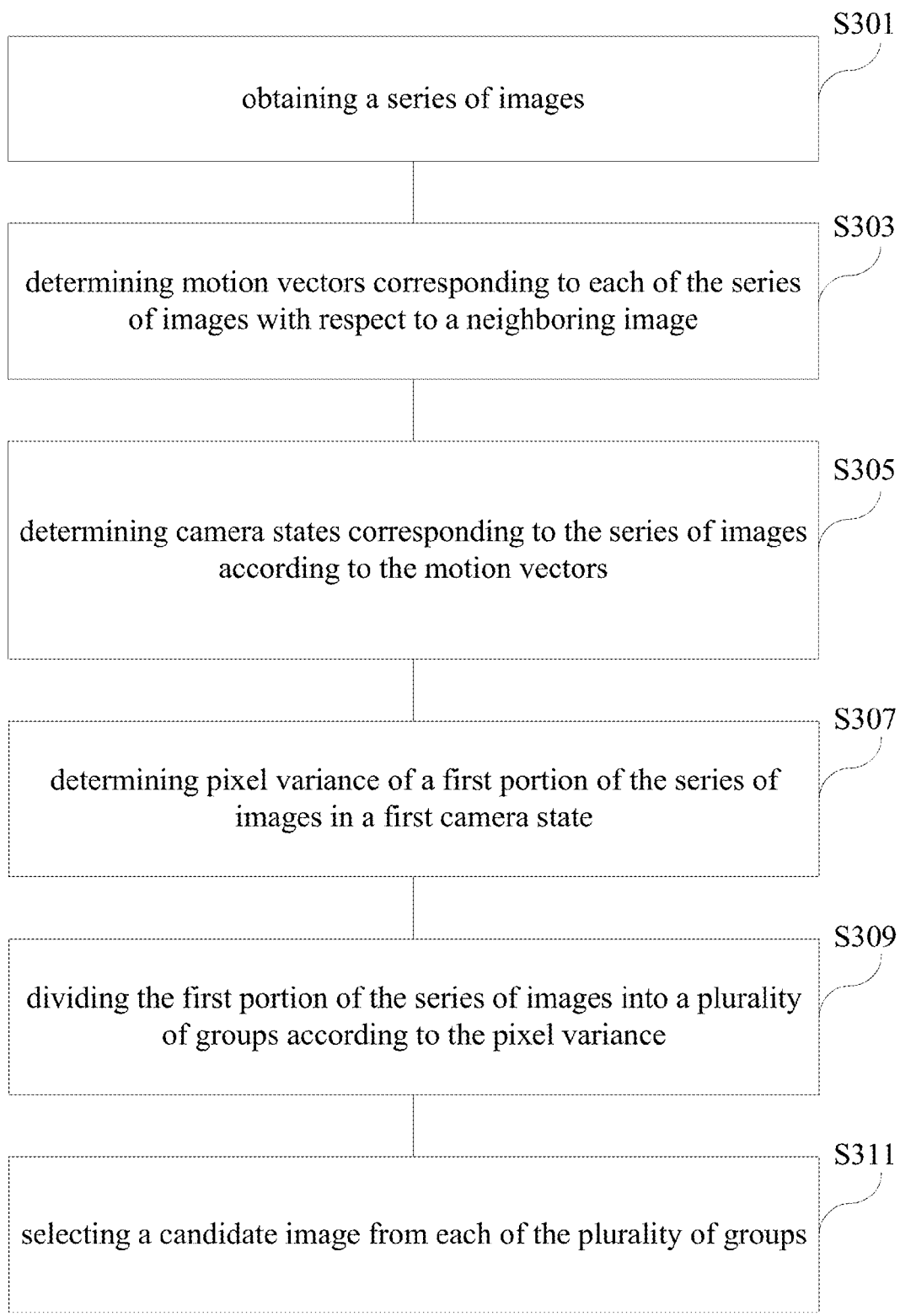
FIG. 8 is a flowchart of an image selection method for use in an electronic device according to a third embodiment of the present invention.

A third embodiment of the present invention is an image selection method for use in an electronic device. The image selection method described in this embodiment may be applied to the electronic device 1 described in the first embodiment. Therefore, the electronic device described in this embodiment may be considered as the electronic device 1 described in the first embodiment A flowchart of the image selection method for use in the electronic device is shown in FIG. 8. As shown in FIG. 8, the image selection method comprises steps S301, S303, S305, S307, S309, and S311. The sequence of the image selection method is changeable without departing from the spirits of the present invention. In detail, step S301 is executed to obtain a series of images; step S303 is executed to determine motion vectors corresponding to each of the series of images with respect to a neighboring image; step S305 is executed to determine camera states corresponding to the series of images according to the motion vectors; step S307 is executed to determine pixel variance of a first portion of the series of images in a first camera state; step S309 is executed to divide the first portion of the series of images into a plurality of groups according to the pixel variance; and step S311 is executed to select a candidate image from each of the plurality of groups.

In summary, the image selection method starts with obtaining a series of images. The series of images may be captured consecutively in time order and/or be accessed from a memory unit accessible to the electronic device. Then motion vectors corresponding to each of the images with respect to a neighboring image are determined. The motion vectors may be formed by difference between to corresponding points in two consecutive frames. These points are selected to represent background objects. Then, a camera state corresponding to each image is determined according to the motion vectors. The camera state comprises two states: camera-still and camera-motion states. The differences of background objects in consecutive images may suggest that the camera is in motion while capturing the images. The invention is aimed to exclude the portion of images taken in the camera-motion state. In an example of this embodiment, the camera state of an image can be determined according to the popularity of corresponding feature vectors.

Next, the pixel variance of a first portion of images in the first camera state is determined. As described above, the images in the camera-motion state are excluded, and now the remaining images in the camera-still state are processed to derive the motion of foreground objects. The motion of foreground objects is derived by pixel variance of each image with respect to all images. The pixel variance may form a feature vector, and each of the first portions of images has a corresponding feature vector. The pixel variance may be calculated by the sum of square differences (SSD), the sum of absolute differences (SAD), the mean square differences (MSD), etc. Then, the first portions of images are divided into a plurality of groups according to the pixel variances, or the variance feature vector.

The dividing processes can be implemented by a clustering algorithm, such as K-means clustering as known in the art. The first portions of images are divided according to the similarity of foreground object motion. The smaller the pixel variance between two consecutive images, the less the motion there is in the present object. As a result, images of the same group may have foreground objects appearing at similar or identical location, and the foreground objects appear at different locations among different groups. The number of groups can be predetermined, designated by the user, or dynamically determined. A candidate image is selected from each of the groups. The candidate image may be selected by predetermined criteria, such as the image with pixel values closest to the median/average value of the group, the image with largest distance to neighboring groups, etc.

In one example of this embodiment, the first camera state is a camera-still state.

In one example of this embodiment, the image selection method may further comprise the following step: scaling down the series of images in resolution by the image processing unit before determining the camera states.

In one example of this embodiment, the electronic device may further comprise a user interface unit which is coupled to the image processing unit. In addition, the image selection method further comprises the following step: displaying the series of images and receiving user inputs corresponding to an operation on at least a portion of the series of images by the user interface unit.

In addition to the aforesaid steps, the image selection method of this embodiment may further comprise other steps corresponding to all the operations of the electronic device 1 set forth in the first embodiment and the image selection method set forth in the second embodiment, and accomplishes all the corresponding functions. Since the steps which are not described in this embodiment can be readily appreciated by persons skilled in the art based on the explanations of the first embodiment and the second embodiment, they will not be further described herein.

According to the above descriptions, the present invention can be implemented to effectively identify usable images among a series of images for meeting the needs of particular image compositions or effects.

The above disclosure is related to the detailed technical contents and inventive features thereof. Persons skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electronic device, comprising:
   at least one image source unit, configured to obtain a series of images; and
   an image processing unit, coupled to the at least one image source unit and configured to:
   determine whether the electronic device is in a camera-still state according to the series of images;
   select first images from the series of images upon the electronic device is determined in the camera-still state;
   determine object states corresponding to the first images;
   divide the first images into at least one group according to the object states; and
   select a candidate image from each of the at least one group.

2. The electronic device as claimed in claim 1, wherein the image processing unit divides the first images into at least two groups and select the candidate image from each of the at least two groups upon determining the object states into an object-motion state.

3. The electronic device as claimed in claim 1, wherein the image processing unit divides the first images into at least one group and select the candidate image from the at least one group upon determining the object states into an object-still state.

4. The electronic device as claimed in claim 1, wherein the image processing unit is further configured to:
   determine motion vectors corresponding to each of the series of images with respect to a neighboring image; and
   determine whether the electronic device is in the camera-still state according to the motion vectors.

5. The electronic device as claimed in claim 4, wherein the image processing unit is further configured to:

extract feature points corresponding to each of the series of images;
determine the motion vectors according to the feature points;
determine background objects corresponding to each of the series of images according to popularity of the motion vectors;
calculate average motion vectors of the background objects corresponding to each of the series of images;
derive location deviations corresponding to the series of images according to the average motion vectors; and
determine whether the electronic device is in the camera-still state according to the location deviations.

6. The electronic device as claimed in claim 1, wherein the image processing unit is further configured to:
determine pixel variance of a first portion of the first images; and
determine the object states according to the pixel variance.

7. The electronic device as claimed in claim 1, wherein the image processing unit is further configured to scale down the series of images in resolution before determining whether the electronic device is in the camera-still state.

8. The electronic device as claimed in claim 1, further comprising a user interface unit coupled to the image processing unit; wherein the user interface unit is configured to display the series of images and receive user inputs corresponding to an operation on at least a portion of the series of images.

9. An image selection method for use in an electronic device, the electronic device comprising at least one image source unit and an image processing unit coupled to the image source unit, the image selection method comprising the following steps:
(a) obtaining a series of images by the image source unit;
(b) determining whether the electronic device is in a camera-still state according to the series of images by the image processing unit camera states corresponding to the series of images by the image processing unit;
(c) selecting first images from the series of images by the image processing unit upon the electronic device is determined in the camera-still state;
(d) determining object states corresponding to the first images by the image processing unit;
(e) dividing the first images into at least one group according to the object states by the image processing unit; and
(f) selecting a candidate image from each of the at least one group by the image processing unit.

10. The image selection method as claimed in claim 9, wherein upon the object states are determined into an object-motion state, the first images are divided into at least two groups, and the candidate image is selected from each of the at least two groups.

11. The image selection method as claimed in claim 9, wherein upon the object states are determined into an object-still state, the first images are divided into at least one group, and the candidate image is selected from the at least one group.

12. The image selection method as claimed in claim 9, wherein the step (b) further comprises the following steps:
(b11) determining motion vectors corresponding to each of the series of images with respect to a neighboring image by the image processing unit; and
(b12) determining whether the electronic device is in the camera-still state by the image processing unit according to the motion vectors.

13. The image selection method as claimed in claim 12, wherein:
the step (b11) further comprises the following steps:
extracting feature points corresponding to each of the series of images by the image processing unit; and
determining the motion vectors according to the feature points by the image processing unit; and
the step (b12) further comprises the following steps:
determining background objects corresponding to each of the series of images according to popularity of the motion vectors by the image processing unit;
calculating average motion vectors of the background objects corresponding to each of the series of images by the image processing unit;
deriving location deviations corresponding to the series of images according to the average motion vectors by the image processing unit; and
determining whether the electronic device is in the camera-still state by the image processing unit according to the location deviations.

14. The image selection method as claimed in claim 9, wherein the step (d) further comprises the following steps:
(d11) determining pixel variance of a first portion of the first images by the image processing unit; and
(d12) determining the object states according to the pixel variance by the image processing unit.

15. The image selection method as claimed in claim 9, further comprising the following steps:
(g) scaling down the series of images in resolution by the image processing unit before determining whether the electronic device is in the camera-still state.

16. The image selection method as claimed in claim 9, wherein the electronic device further comprises a user interface unit coupled to the image processing unit, and the image selection method further comprises the following step:
(h) displaying the series of images and receiving user inputs corresponding to an operation on at least a portion of the series of images by the user interface unit.

17. An image selection method for use in an electronic device, comprising:
(a) obtaining a series of images;
(b) determining motion vectors corresponding to each of the series of images with respect to a neighboring image;
(c) determining whether the electronic device is in a camera-still state according to the motion vectors;
(d) determining pixel variance of a first portion of the series of images upon the electronic device is determined in the camera-still state;
(e) dividing the first portion of the series of images into at least one group according to the pixel variance; and
(f) selecting a candidate image from each of the at least one group.

18. The image selection method as claimed in claim 17, further comprising the following steps:
(g) scaling down the series of images in resolution before determining whether the electronic device is in the camera-still state.

19. The image selection method as claimed in claim 17, further comprises the following step:
(h) displaying the series of images and receiving user inputs corresponding to an operation on at least a portion of the series of images.

* * * * *